J. HILDEBRAND.
Corn-Planters.

No. 134,279. Patented Dec. 24, 1872.

Witnesses.
C. F. Brown
D. K. Ellsworth

Inventor
John Hildebrand
By Still Ellsworth
His Attorneys.

UNITED STATES PATENT OFFICE.

JOHN HILDEBRAND, OF TANEYTOWN, MARYLAND, ASSIGNOR OF ONE-HALF OF HIS RIGHT TO DANIEL H. SWOPE, OF SAME PLACE.

IMPROVEMENT IN CORN-PLANTERS.

Specification forming part of Letters Patent No. 134,279, dated December 24, 1872.

*To all whom it may concern:*

Be it known that I, JOHN HILDEBRAND, of Taneytown, in the county of Carroll, State of Maryland, have invented certain new and useful Improvements in Corn-Planters; and I do hereby declare the following to be a full, clear, and exact description of the same, reference being had to the accompanying drawing forming part of this specification, in which—

Figure 1:
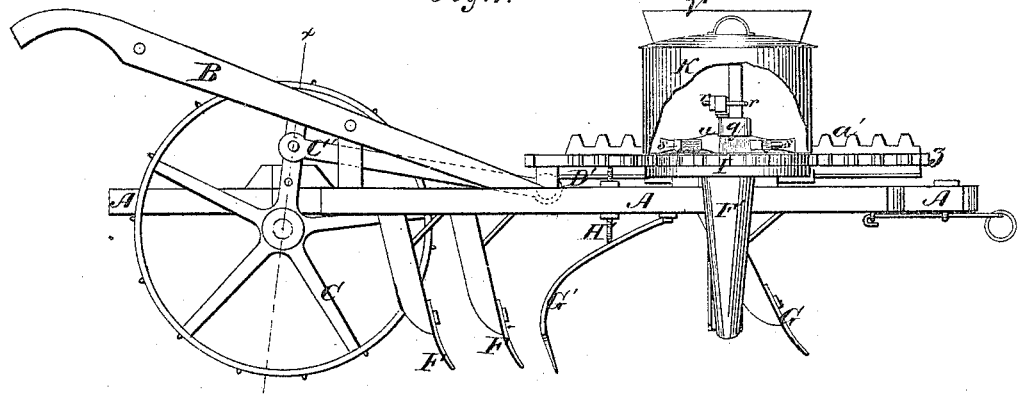
Figures 2, 5:
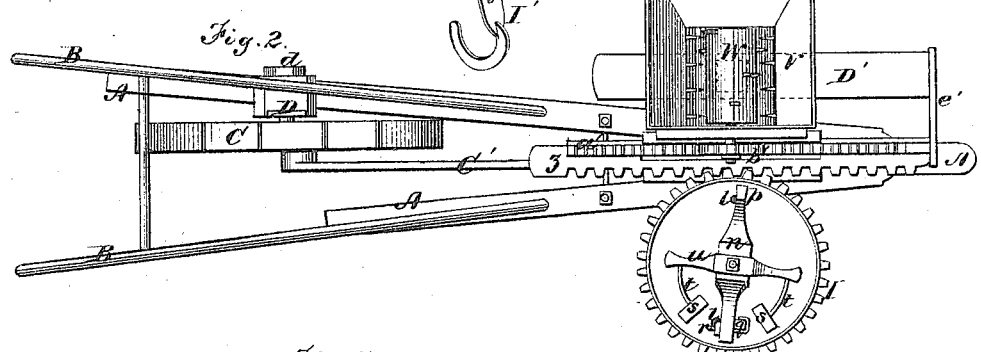
Figure 3:
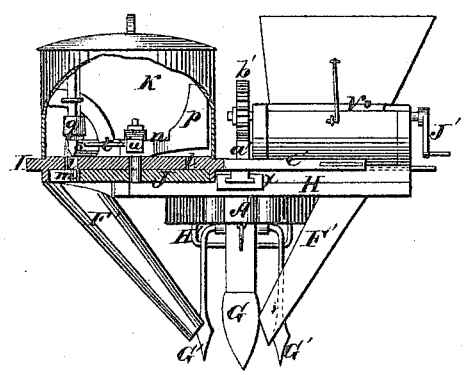
Figure 4:
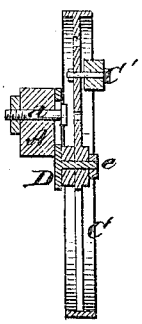

Figure 1 is a side elevation of my improved corn-planter, part of the hopper being broken away to show the interior; Fig. 2 is a top-plan view with the covers of the hoppers removed; Fig. 3 is a front elevation of the machine; Fig. 4 is a vertical section of the supporting and operating wheel; and Fig. 5 is a detached view of parts to be hereinafter referred to.

Similar letters of reference in the accompanying drawing denote the same parts.

My invention has for its object to improve the construction and operation of corn-planters; and to this end it consists in the construction and combination of parts, as I will now proceed to describe.

In the accompanying drawing, A is the frame of the machine, made V-shaped in form, with one arm longer than the other, and provided with handles B at its rear end. F are the covering plows or shovels, attached respectively to the arms of the frame near the rear end, so that the one upon the long arm shall be somewhat in advance of that upon the short arm. G is the furrow-opener, secured to the frame at or near the junction of the arms. C is the driving and supporting wheel, mounted upon the inner side of the long arm, and in rear of the short arm of the frame, by means of the adjustable plate D. The lateral arm $e$ of the plate forms the axle of the wheel, while the plate itself is held in a vertical groove of the arm by the screw-bolt $d$. By this arrangement the plate and wheel are made adjustable upon the frame to regulate the depth at which the covering-plows F shall run in the ground. H is a plate affixed transversely to the top of the frame, immediately over the furrow-opener G, and supports at opposite ends the mechanism for feeding the seeds and fertilizer. The device composing the seeding mechanism consists of a large gear-wheel, I, recessed upon its under side to fit over and inclose a circular disk, J, affixed to one end of the plate H, which in the drawing is at the right of the frame. The gear-wheel supports the grain-hopper K, and is provided with a seed opening or perforation, $l$, which, as the wheel oscillates, registers with and sweeps over a large opening, $m$, in the outer edge of the disk. $n$ is an angular or curved sweep, hung at or near its center upon the shaft or upright $o$, which forms the axis of the feed-wheel. The upright arm $p$ of the sweep extends nearly to the inner side of the hopper, and serves to stir the grain and prevent it from accumulating or banking against the side of the hopper as the latter oscillates with the feed-wheel. The opposite end of the sweep carries a brush, $q$, which bears upon the feed-wheel to hold the grain within the seed-opening with a yielding pressure, and at the same time cut off the bulk of the seed within the hopper from that within the seed-opening. The brush is adapted for vertical adjustment to bear with greater or less force upon the seed, or to be held at a greater or less distance from the opening by means of the hook and nut $r$ in the sweep, as shown. S are sweep-blocks, held upon opposite sides of the brush by spring-arms $t$, which, in their turn, are attached to the ends of a cross-bar, $u$, mounted upon the shaft $o$, above the main sweep. V is the base or main hopper for the fertilizer, mounted upon the opposite end of the plate H. It is made concave, and provided with an opening in its bottom to correspond with a similar opening in the plate. The top of the hopper is made removable by any suitable means. W is a cylinder, having its bearings in the end of the hopper, and provided with a series of teeth, which act in connection with similar teeth in the hopper to grind and pulverize the fertilizer when the cylinder is oscillated. $x$ is a grooved plate, secured to the top of the plate H between the feed wheel and hopper V, to receive a flanged bar extending longitudinally of the frame. This bar is provided with a lateral rack, $z$, to engage with the geared feed-wheel, and with a vertical rack, $a'$, to engage with a pinion, $b'$, affixed to the inner end of the cylinder-shaft. A pitman, $C'$, connects the end of the rack-bar with a crank-pin of the driving and supporting wheel, as shown in Figs. 1 and 2. $D'$ is a slide, affixed by a lateral arm, e', to the forward end of the rack-bar, and passing transversely between the hopper V and its supporting-plate H. It is provided with an opening near its center corresponding in size to the openings in the hopper and plate. The rack-bar is so adjusted with respect to the pinion b' and feed-plate I that the feed-opening in the latter shall register with the opening m in the disk J at the same instant the opening in the slide D' coincides with those in the hopper V and plate H.

The operation of the machine thus far described is as follows: The hopper K being filled with corn and the hopper V with guano or other fertilizer, the covers of such hoppers are applied and the machine set in motion. The rotation of the driving-wheel causes the rack-bar to reciprocate and impart an oscillating motion to the toothed cylinder W and the feed-wheel I and its hopper. As the opening in the feed-wheel passes from under the brush it is filled with corn from the hopper, the blocks S serving to scrape off the surplus grain before the opening again reaches the brush. The blocks S also serve to feed the grain to the opening from each side, and, owing to the elasticity of their arms t, are prevented from breaking such of the grain as projects above the opening or passes between them and the feed-plate. Inasmuch as the sweep n and its attachments are held stationary with respect to the axle o while the hopper and feed-wheel oscillate, it is necessary that some provision be made to feed the grain to the discharge-opening. This provision is found in the arm p, which moves the grain first in one and then in the opposite direction toward the opening and in the blocks S, which push the grain forward to fill the opening. The brush r acts as a cut-off to separate the grain in the hopper from that in the opening of the wheel, and, owing to its yielding nature, rides over the grain without breaking or cutting it, as would be the case if the cut-off were unyielding. To feed different quantities of seed from the hopper, openings of different sizes are made in the feed-wheel, and the latter adjusted or changed on its axis o to bring the required opening into the requisite position with respect to the discharging devices. As the rack-bar is operated to move the feed-wheel it reciprocates the slide D' to alternately open and close the passage through the hopper V and plate H, and oscillates the cylinder W to grind and pulverize the fertilizer.

The mechanism above described is so adjusted that the seed and fertilizer are discharged simultaneously from their respective hoppers and conducted through inclined spouts F' into the furrow immediately in rear of the furrow-opener G. By this means the seed is planted in hills and fertilized at the same time. To change the distance between the hills the throw of the rack-bar is adjusted by moving the wrist-pin of the pitman C' nearer to or further from the center of the driving-wheel, a series of holes being provided in the latter for this purpose. The contents of the hills are covered by the plows F, as will be readily understood.

G' are scrapers formed of a rod bent into V-shape and hinged to the under side of the frame between the covering-plows and discharge-spouts so as to move on each side of the furrow. They not only serve to cover the hills slightly with earth, but act as scrapers to remove clods, roots, vines, &c., from the front of the plows. The depth at which they enter the ground is regulated by the yoke H' made vertically adjustable in the frame A.

To cover the grain and fertilizer at a shallow depth, I remove the plows F from their standards, and supply their place with the curved piece I', shown in Fig. 5, the curved portion extending rearward. These pieces move through the dirt and throw but a small quantity upon the furrow.

If desired the corn-planter may be used separately from the fertilizer by removing the pinion b' of the cylinder, and detaching the slide from the rack bar, or by removing the vertical rack a' without disturbing the pinion and slide.

To pulverize the fertilizer when the cylinder is not operated by the rack-bar, I attach a crank, J', to the shaft of such cylinder and operate it by hand.

Having thus described my invention, what I claim is—

1. The reciprocating double rack-bar driven from the supporting-wheel to operate both the seeding devices and the devices for grinding and discharging the fertilizer, substantially as described, for the purposes specified.

2. The geared feed-wheel forming the bottom of the hopper, combined with the rack-bar, so that when the latter is reciprocated it shall oscillate the former upon its axis together with the hopper, substantially as described, for the purposes specified.

3. The combination of the rack-bar with the cylinder W and slide D', so that when the rack-bar is reciprocated it shall reciprocate the slide and oscillate the cylinder upon its axis, substantially as described, for the purposes specified.

4. The corn-feeding devices, consisting of the sweep, the adjustable brush r, and the spring-blocks S, substantially as described, for the purposes specified.

5. In combination with an oscillating feed-plate, the stationary brush r and spring-blocks S, substantially as described, for the purposes specified.

6. The arrangement of the base-plate H, the seeding and fertilizing mechanism, the guide-block x, and the discharge-spouts F, with respect to each other and the frame A as herein shown and described, for the purposes specified.

7. The hinged scrapers G' arranged to operate, in connection with the independent adjustable yoke H', as herein described, for the purpose specified.

8. The fixed sweep n provided with the upright p, in combination with the feed-plate, whereby the oscillations of the latter shall cause the upright to move the corn in the hopper alternately in opposite directions toward the discharge-opening in such feed-plate, substantially as described, for the purposes specified.

9. The seeding mechanism and the recessed oscillating feed-wheel I, in combination with the stationary disk J, substantially as described, for the purposes specified.

10. The hooked pieces I', constructed as described, for application to the plow-standards, as herein set forth and shown.

JOHN HILDEBRAND.

Witnesses:
N. K. ELLSWORTH,
C. F. BROWN.